(12) United States Patent
Tomi et al.

(10) Patent No.: US 6,214,256 B1
(45) Date of Patent: Apr. 10, 2001

(54) LIQUID CRYSTAL COMPOSITIONS AND LIQUID CRYSTAL DISPLAY DEVICES

(75) Inventors: Yoshitaka Tomi, Moriyama; Fusayuki Takeshita, Sodegaura; Etsuo Nakagawa, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/388,431

(22) Filed: Sep. 2, 1999

(30) Foreign Application Priority Data

Sep. 10, 1998 (JP) .................................................. 10-256408

(51) Int. Cl.$^7$ .......................... C09K 19/30; C09K 19/12; C09K 19/34; C09K 19/06
(52) U.S. Cl. ................................ 252/299.63; 252/299.66; 252/299.61; 252/299.6; 252/299.67
(58) Field of Search .......................... 252/299.63, 299.66, 252/299.61, 299.67, 299.6

(56) References Cited

U.S. PATENT DOCUMENTS

| | | | |
|---|---|---|---|
| 5,589,102 | * | 12/1996 | Bartmann et al. ............... 252/299.01 |
| 5,728,319 | * | 3/1998 | Matsui et al. .................... 252/299.63 |
| 5,792,386 | * | 8/1998 | Matsui et al. .................... 252/299.01 |
| 5,858,270 | * | 1/1999 | Matsui et al. .................... 252/299.01 |
| 5,858,272 | * | 1/1999 | Haseba et al. ................... 252/299.61 |
| 5,961,881 | * | 10/1999 | Andou et al. .................... 252/299.63 |
| 6,007,740 | * | 12/1999 | Andou et al. .................... 252/299.63 |

FOREIGN PATENT DOCUMENTS

| | | |
|---|---|---|
| 7-300582 | 11/1995 | (JP) . |
| 7-300584 | 11/1995 | (JP) . |
| 7-300585 | 11/1995 | (JP) . |
| WO 96/11897 | 4/1996 | (WO) . |

* cited by examiner

Primary Examiner—C. H. Kelly
(74) Attorney, Agent, or Firm—McDermott, Will & Emery

(57) ABSTRACT

A liquid crystal composition is disclosed which comprises:
- as a first component at least one of the compounds of the following formulas (1-1) and (1-2);
- as a second component at least one of the compounds of the following formula (2);
- as a third component at least one of the compounds of the following formulas (3-1) and (3-2); and
- as a fourth component at least one of the compounds of the following formulas (4-1) to (4-3)

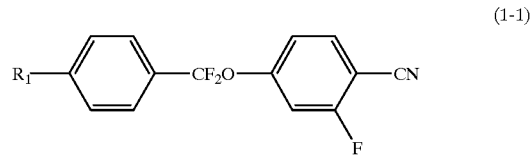

(1-1)

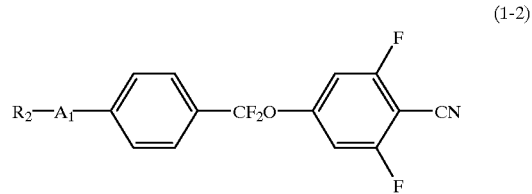

(1-2)

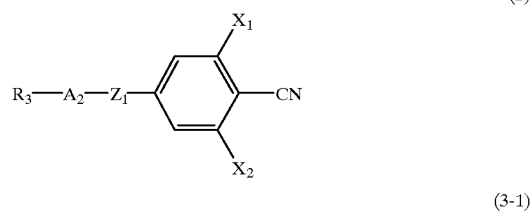

(2)

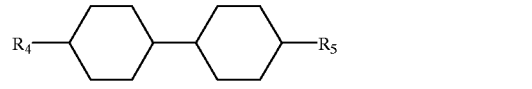

(3-1)

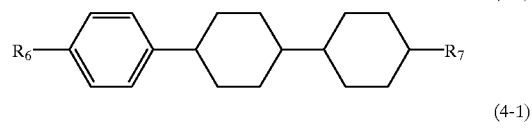

(3-2)

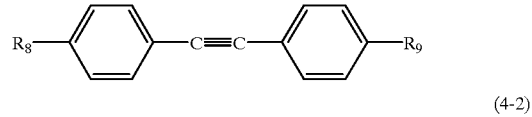

(4-1)

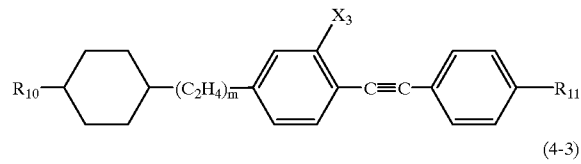

(4-2)

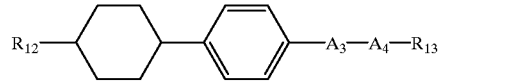

(4-3)

17 Claims, No Drawings

LIQUID CRYSTAL COMPOSITIONS AND LIQUID CRYSTAL DISPLAY DEVICES

FIELD OF THE INVENTION

This invention relates to a nematic liquid crystal composition. More particularly, the invention relates to a liquid crystal composition suitable for a supertwisted nematic (STN) mode and to a liquid crystal display device using the liquid crystal composition.

BACKGROUND OF THE INVENTION

As the liquid crystal composition used in the liquid crystal display device, those of a twisted nematic (TN) mode and a supertwisted nematic (STN) mode have been used extensively. In recent years, the STN mode is prevailing in the use of a liquid crystal display device for hand-held terminals, e.g. electronic notepads, laptop computers which are often used in the open air.

The liquid crystal compositions used in the STN mode have required the following general characteristics (1) to (4). In addition, the liquid crystal compositions used in the STN mode in the open air have required the following general characteristics (5) and (6).
(1) A steepness in a threshold voltage characteristic of the liquid crystal composition should be improved as well as possible in order to increase a contrast of the liquid crystal display device (The voltage-transmittance characteristics (steepness) should be steep).
(2) A viscosity of the liquid crystal composition should be reduced as low as possible in order to decrease a response time of the liquid crystal display device.
(3) An optical anisotropy ($\Delta n$) of the liquid crystal composition can take a suitable value depending on a cell thickness (d) of the liquid crystal display device in order to increase a contrast of the liquid crystal display device.
(4) The liquid crystal composition should exhibit a nematic phase in a wide temperature range in order to extend a temperature range at which the liquid crystal display device can be used (The upper-limit temperature of the nematic phase is increased and the lower-limit temperature of the nematic phase is reduced).
(5) A threshold voltage of the liquid crystal composition should be reduced in order to provide a smaller-sized battery serving as a power for driving the liquid crystal display device. Further, a temperature dependence of the threshold voltage of the liquid crystal composition should be reduced.
(6) The liquid crystal composition should have a high stability to heat and ultraviolet rays in order to maintain semi-permanently the display quality of the liquid crystal display device.

The liquid crystal compositions for STN having relatively low threshold voltage and relatively good temperature characteristics of the threshold voltage are disclosed in Japanese Patent Kokai 7-300582, Japanese Patent Kokai 7-300585 and Japanese Patent Kokai 7-300584. Those compositions have the problem of poor steepness in the voltage-transmittance characteristics and poor stability to heat and ultraviolet rays, as shown in comparative examples which will be given later.

As liquid crystalline compounds for low voltage driving in various modes including TN and STN modes, WO 96/11897 discloses new liquid crystalline compounds having large dielectric anisotropy ($\Delta e$) and very low viscosity as well as liquid crystal compositions containing said compounds. Composition Examples 19–22 of WO 96/11897 illustrate the compositions which contain the compounds having —$CF_2O$— as a linking group and having 3,5-difluoro-4-cyanophenyl at the end group. The composition shown in Composition Example 19 is analogous to that of the present invention, but has the problems of poor steepness in the voltage-transmittance characteristics, high threshold voltage and large temperature dependence of the threshold voltage.

Although such investigation has been made, there is no development of a liquid crystal composition for the STN mode which can be used in the open air, satisfying the above characteristics (5) and (6) in addition to the above characteristics (1) to (4).

Thus there is a continuing need for an improved liquid crystal composition.

SUMMARY OF THE INVENTION

An object of the invention is to provide a liquid crystal composition especially having good steepness in the voltage-transmittance characteristics, low threshold voltage, low temperature dependence of threshold voltage and high stability to heat and ultraviolet rays, while satisfying general characteristics required for the STN display mode.

Through our intensive studies on compositions using various liquid crystalline compounds in an effort to solve the above-mentioned problems, we have found that the above object of the present invention can be achieved by using the liquid crystal compositions of the present invention in a display device for STN.

DETAILED DESCRIPTION OF THE INVENTION

The present invention provides a liquid crystal composition which comprises:

as a first component at least one of the compounds of the following formulas (1-1) and (1-2);

as a second component at least one of the compounds of the following formula (2);

as a third component at least one of the compounds of the following formulas (3-1) and (3-2); and as a fourth component at least one of the compounds of the following formulas (4-1) to (4-3)

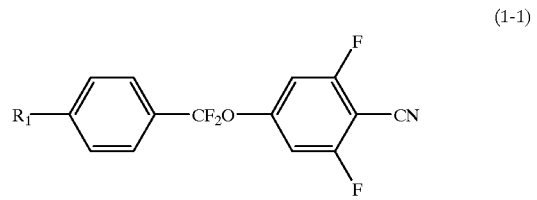

(1-1)

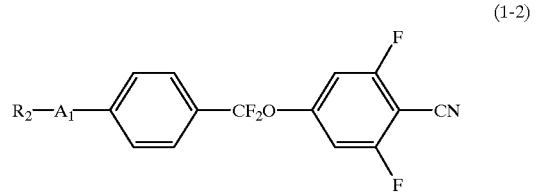

(1-2)

-continued (2)

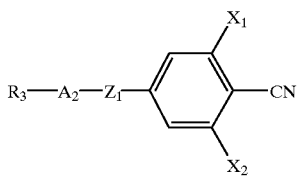

(3-1)

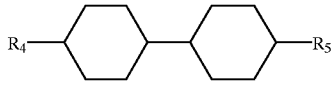

(3-2)

(4-1)

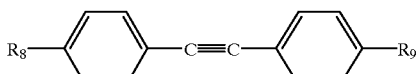

(4-2)

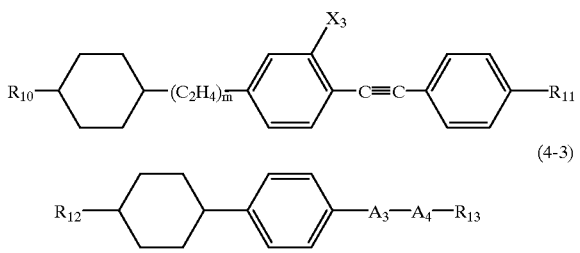

(4-3)

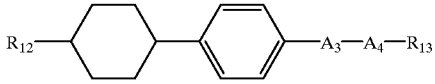

in which $R_1$, $R_2$, $R_6$, $R_8$, $R_{10}$, $R_{11}$ and $R_{13}$ each independently represent an alkyl group of 1–10 carbons; $R_3$ represents an alkyl group of 1–10 carbons, an alkoxymethyl group of 2–10 carbons or an alkenyl group of 2–10 carbons; $R_4$ represents an alkyl group of 1–10 carbons or an alkenyl group of 2–10 carbons; $R_5$ and $R_7$ each independently represent an alkenyl group of 2–10 carbons wherein one or more hydrogen atoms may be replaced by fluorine atoms; $R_9$ represents an alkyl group of 1–10 carbons or an alkoxy group of 1–10 carbons; $R_{12}$ represents an alkyl group of 1–10 carbons or an alkoxymethyl group of 2–10 carbons; $A_1$ represents trans-1,4-cyclohexylene or trans-1,3-dioxane-2,5-diyl; $A_2$ and $A_4$ each independently represent trans-1,4-cyclohexylene or 1,4-phenylene; $A_3$ represents 1,4-phenylene which may be substituted by F; $X_1$, $X_2$ and $X_3$ each independently represent H or F; $Z_1$ represents —COO—, —CH$_2$CH$_2$— or a single bond; and m represents 0 or 1.

In one embodiment of said liquid crystal composition, the first component comprises 5–50% by weight, the second component comprises 5–60% by weight, the third component comprises 10–50% by weight and the fourth component comprises 5–30% by weight, based on the total weight of the liquid crystal composition.

The liquid crystal composition of the invention may further comprise as a fifth component at least one of the compounds of the following formula (5)

(5)

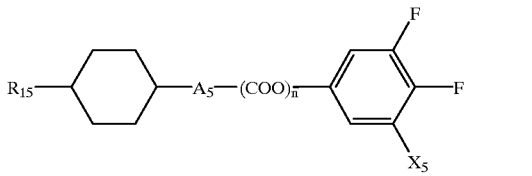

wherein $R_{14}$ represents an alkyl group of 1–10 carbons and $X_4$ represents H or F. In one embodiment of said liquid crystal composition, the first component comprises 5–50% by weight, the second component comprises 5–60% by weight, the third component comprises 10–50% by weight and the fourth component comprises 5–30% by weight and the fifth component comprises not more than 35% by weight, preferably 5 to 30% by weight, of at least one of the compounds of formula (5), based on the total weight of the liquid crystal composition.

The liquid crystal composition of the invention may further comprise as a fifth component at least one of the compounds of the following formulas (6-1) to (6-3)

(6-1)

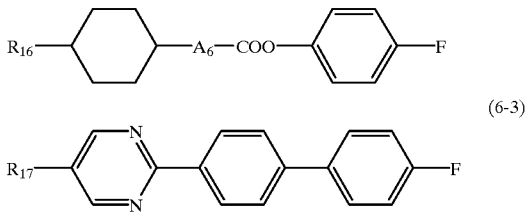

(6-2)

(6-3)

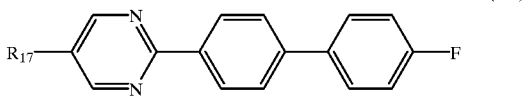

wherein $R_{15}$, $R_{16}$ and $R_{17}$ each independently represent an alkyl group of 1–10 carbons; $X_5$ represents H or F; $A_5$ and $A_6$ each independently represent trans-1,4-cyclohexylene or 1,4-phenylene; and n represents 0 or 1. In one embodiment of said liquid crystal composition, the first component comprises 5–50% by weight, the second component comprises 5–60% by weight, the third component comprises 10–50% by weight, the fourth component comprises 5–30% by weight and the fifth component comprises not more than 30% by weight, preferably 5 to 25% by weight, of at least one of the compounds of formulas (6-1) to (6-3), based on the total weight of the liquid crystal composition.

The liquid crystal composition of the invention may further comprise as a fifth component at least one of the compounds of the following formulas (7-1) and (7-2)

(7-1)

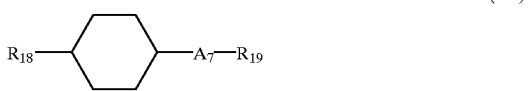

(7-2)

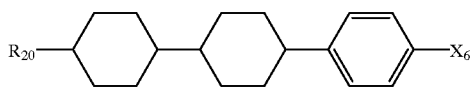

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F, Cl, an alkyl group of 1–10 carbons or an alkoxy group of 1–10 carbons; and A, represents trans-1,4-cyclohexylene or 1,4-phenylene. In one embodiment of said liquid crystal composition, the first component comprises 5–50% by weight, the second component comprises 5–60% by weight, the third component comprises 10–50% by weight, the fourth component comprises 5–30% by weight and the fifth component comprises not more than 30% by weight, preferably 5 to 25% by weight, of at least one of the compounds of formulas (7-1) and (7-2), based on the total weight of the liquid-crystal composition.

The liquid crystal composition of the invention may further comprise as a fifth component at least one of the compounds of formula (5) and as a sixth component at least one of the compounds of formulas (6-1) to (6-3). In one embodiment of said liquid crystal composition, the first component comprises 5–50% by weight, the second component comprises 5–60% by weight, the third component comprises 10–50% by weight, the fourth component comprises 5–30% by weight, the fifth component comprises not more than 35% by weight, preferably 5 to 30% by weight, of at least one of the compounds of formula (5) and the sixth component comprises not more than 30% by weight, preferably 5 to 25% by weight, of at least one of the compounds of formulas (6-1) to (6-3), based on the total weight of the liquid crystal composition.

The liquid crystal composition of the invention may further comprise as a fifth component at least one of the compounds of formula (5) and as a sixth component at least one of the compounds of formulas (7-1) and (7-2). In one embodiment of said liquid crystal composition, the first component comprises 5–50% by weight, the second component comprises 5–60% by weight, the third component comprises 10– 50% by weight, the fourth component comprises 5–30% by weight, the fifth component comprises not more than 35% by weight, preferably 5 to 30% by weight, of at least one of the compounds of formula (5) and the sixth component comprises not more than 30% by weight, preferably 5 to 25% by weight, of at least one of the compounds of formulas (7-1) and (7-2), based on the total weight of the liquid crystal composition.

The liquid crystal composition of the invention may further comprise as a fifth component at least one of the compounds of formula (5), as a sixth component at least one of the compounds of formulas (6-1) to (6-3) and as a seventh component at least one of the compounds of formulas (7-1) and (7-2). In one embodiment of said liquid crystal ii composition, the first component comprises 5–50% by weight, the second component comprises 5–60% by weight, the third component comprises 10–50% by weight, the fourth component comprises 5–30% by weight, the fifth component comprises not more than 35% by weight, preferably 5 to 30% by weight, of at least one of the compounds of formula (5), the sixth component comprises not more than 30% by weight, preferably 5 to 25% by weight, of at least one of the compounds of formulas (6-1) to (6-3) and the seventh component comprises not more than 30% by weight, preferably 5 to 25% by weight, of at least one of the compounds of formulas (7-1) and (7-2), based on the total weight of the liquid crystal composition.

Further, the present invention provides a liquid crystal display device using each of the above-described liquid crystal compositions according to the present invention.

PREFERRED EMBODIMENTS OF THE INVENTION

Preferred examples of the compounds of formula (1-1) used in the present liquid crystal composition can include those of the following formula (1-1-1)

(1-1-1)

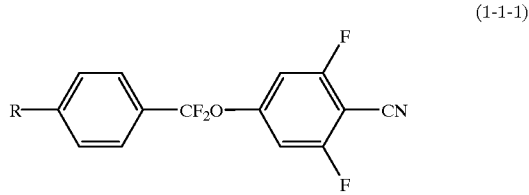

in which R represents an alkyl group of 1–10 carbons.

Preferred examples of the compounds of formula (1-2) used in the present liquid crystal composition can include those of the following formulas (1-2-1) and (1-2-2)

(1-2-1)

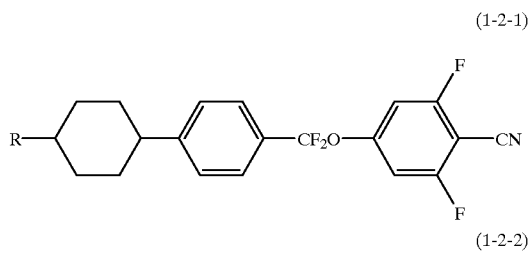

(1-2-2)

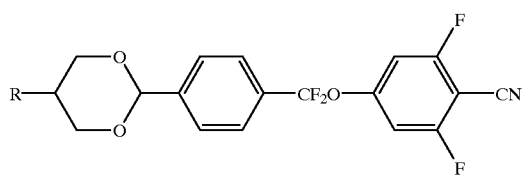

in which R represents an alkyl group of 1–10 carbons.

Preferred examples of the compounds of formula (2) used in the present liquid crystal composition can include those of the following formulas (2-1) to (2-8)

(2-1)

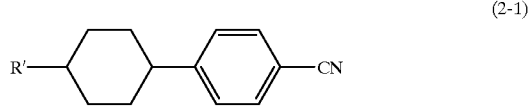

(2-2)

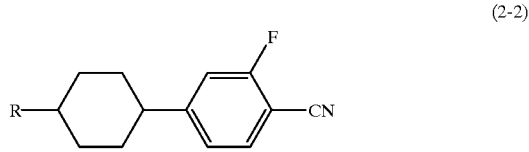

-continued (2-3)
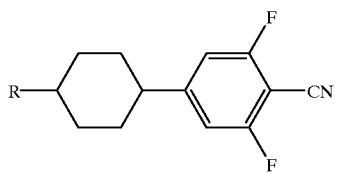

(2-4)
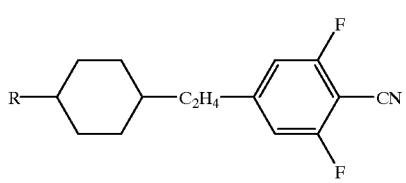

(2-5)
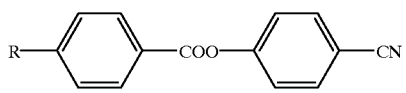

(2-6)
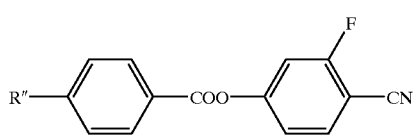

(2-7)
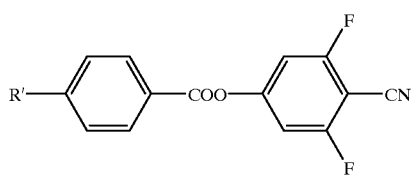

(2-8)
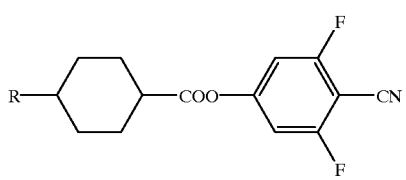

in which R represents an alkyl group of 1–10 carbons, R' represents an alkyl group of 1–10 carbons or an alkenyl group of 2–10 carbons and R" represents an alkyl group of 1–10 carbons or an alkoxymethyl group of 2–10 carbons.

Preferred examples of the compounds of formula (3-1) used in the present liquid crystal composition can include those of the following formulas (3-1-1) and (3-1-2)

(3-1-1)
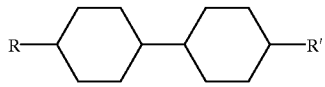

(3-1-2)
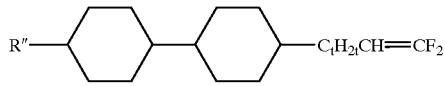

in which R represents an alkyl group of 1–10 carbons, R' represents an alkenyl group of 2–10 carbons and t represents an integer of 0 to 8.

Preferred examples of the compounds of formula (3-2) used in the present liquid crystal composition can include those of the following formulas (3-2-1) and (3-2-2)

(3-2-1)
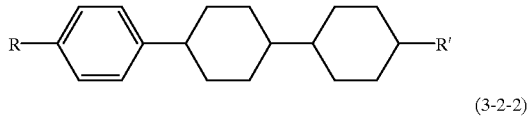

(3-2-2)
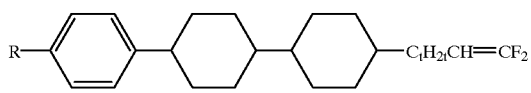

in which R represents an alkyl group of 1–10 carbons, R' represents an alkenyl group of 2–10 carbons and t represents an integer of 0 to 8.

Preferred examples of the compounds of formula (4-1) used in the present liquid crystal composition can include those of the following formula (4-1-1)

(4-1-1)
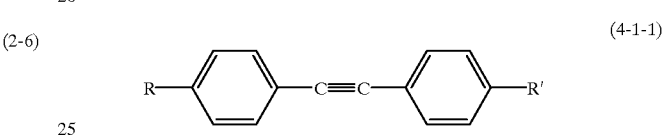

in which R represents an alkyl group of 1–10 carbons and R' represents an alkyl group of 1–10 carbons or an alkoxy group of 1–10 carbons.

Preferred examples of the compounds of formula (4-2) used in the present liquid crystal composition can include those of the following formulas (4-2-1) and (4-2-2)

(4-2-1)
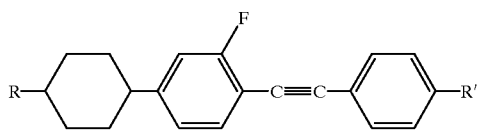

(4-2-2)
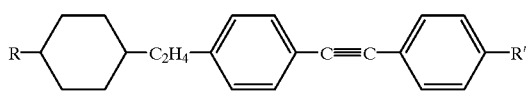

wherein R and R' each independently represent an alkyl group of 1–10 carbons.

Preferred examples of the compounds of formula (4-3) used in the present liquid crystal composition can include those of the following formulas (4-3-1) and (4-3-2)

(4-3-1)
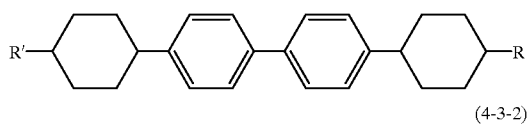

(4-3-2)
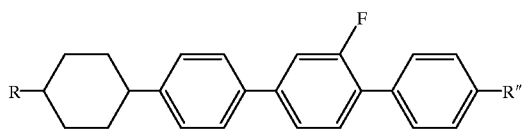

in which R and R" each independently represent an alkyl group of 1–10 carbons and R' represents an alkoxymethyl group of 2–9 carbons.

Preferred examples of the compounds of formula (5) used in the present liquid crystal composition can include those of the following formulas (5-1) and (5-2)

(5-1)

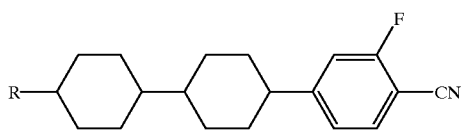
(5-2)

in which R represents an alkyl group of 1–10 carbons.

Preferred examples of the compounds of formula (6-1) used in the present liquid crystal composition can include those of the following formulas (6-1-1) to (6-1-4)

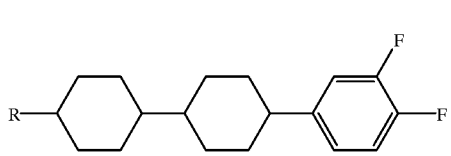
(6-1-1)

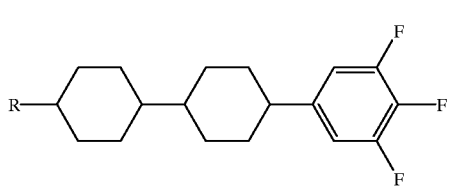
(6-1-2)

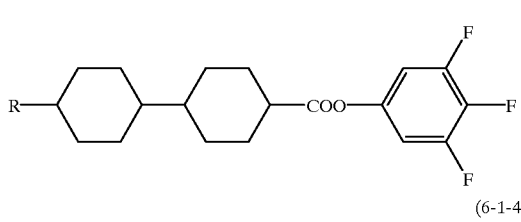
(6-1-3)

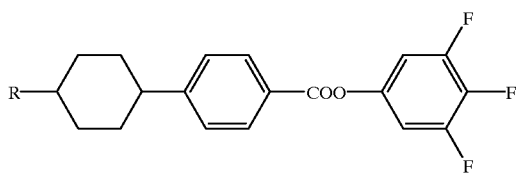
(6-1-4)

in which R represents an alkyl group of 1–10 carbons.

Preferred examples of the compounds of formula (6-2) used in the present liquid crystal composition can include those of the following formulas (6-2-1) and (6-2-2)

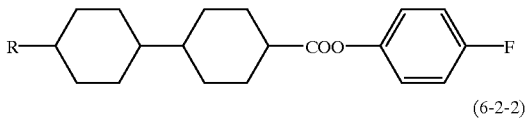
(6-2-1)

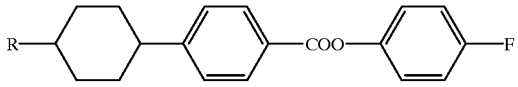
(6-2-2)

in which R represents an alkyl group of 1–10 carbons.

Preferred examples of the compounds of formula (6-3) used in the present liquid crystal composition can include those of the following formula (6-3-1)

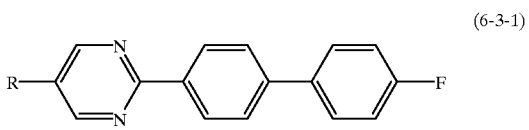
(6-3-1)

in which R represents an alkyl group of 1–10 carbons.

Preferred examples of the compounds of formula (7-1) used in the present liquid crystal composition can include those of the following formulas (7-1-1) and (7-1-2)

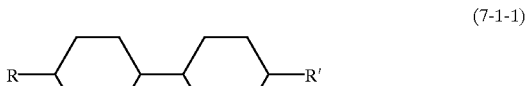
(7-1-1)

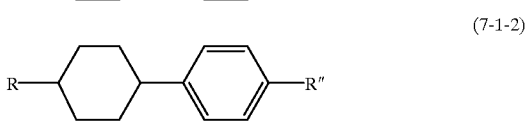
(7-1-2)

in which R and R' each independently represent an alkyl group of 1–10 carbons and R" represents an alkoxy group of 1–10 carbons.

Preferred examples of the compounds of formula (7-2) used in the present liquid crystal composition can include those of the following formulas (7-2-1) to (7-2-3)

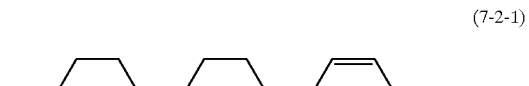
(7-2-1)

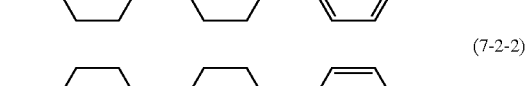
(7-2-2)

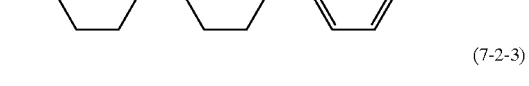
(7-2-3)

in which R represents an alkyl group of 1–10 carbons and R' represents an alkyl group of 1–10 carbons or an alkoxy group of 1–10 carbons.

A role of each compound constituting the liquid crystal composition of the invention will be explained below.

The compounds of formulas (1-1) and (1-2) are characterized in that a dielectric anisotropy is large, a rate of change of a dielectric anisotropy to a temperature change is substantially equal to a rate of change of an elastic constant to a temperature change and a stability to heat and ultraviolet rays is high. Thus the compounds of formulas (1-1) and (1-2) are used for the purpose of reducing the threshold voltage and further reducing the temperature dependence of threshold voltage, while keeping high stability of the liquid crystal composition to heat and ultraviolet rays.

The compounds of formula (2) have a dielectric anisotropy substantially equal to or less than that of the compounds of formulas (1-1) and (1-2). Thus the compounds of formula (2) are used for the purpose of further reducing the threshold voltage of the liquid crystal composition.

The compounds of formula (3-1) are characterized in that a dielectric anisotropy is approximately zero and a viscosity is low and an elastic constant ratio ($K_{33}/K_{11}$) is large. Thus the compounds of formula (3-1) are used for the purpose of reducing the viscosity of the liquid crystal composition and simultaneously improving the steepness in the voltage-transmittance characteristics.

The compounds of formula (3-2) are characterized in that a dielectric anisotropy is approximately zero, an elastic constant ratio ($K_{33}/K_{11}$) is large and a clearing point ($T_{NI}$) is high. Thus the compounds of formula (3-2) are used for the purpose of reducing the viscosity of the liquid crystal composition and simultaneously improving the steepness in the voltage-transmittance characteristics, and further increasing the clearing point.

The compounds of formula (4-1) are characterized in that a dielectric anisotropy is approximately zero, a viscosity is low and an optical anisotropy is large. Thus the compounds of formula (4-1) are used for the purpose of reducing the viscosity of the liquid crystal composition and simultaneously increasing the optical anisotropy or adjusting the optical anisotropy.

The compounds of formula (4-2) are characterized in that a dielectric anisotropy is approximately zero, a viscosity is low, an optical anisotropy is large and a clearing point is high. Thus the compounds of formula (4-2) are used for the purpose of reducing the viscosity of the liquid crystal composition and simultaneously increasing the optical anisotropy or adjusting the optical anisotropy, and further increasing the clearing point.

The compounds of formula (4-3) are characterized in that a dielectric anisotropy is approximately zero, an optical anisotropy is relatively large and a clearing point is especially high. Thus the compounds of formula (4-3) are used for the purpose of adjusting the optical anisotropy of the liquid crystal composition and more increasing the clearing point.

The compounds of formula (5) are characterized by having a little lower positive dielectric anisotropy than those of formulas (1-1) and (1-2) as well as a high clearing point. Thus the compounds of formula (5) are used for the purpose of adjusting the clearing point and threshold voltage of the liquid crystal composition.

The compounds of formulas (6-1) to (6-3) have a little lower positive dielectric anisotropy than those of formulas (1-1) and (1-2). Thus the compounds of formulas (6-1) to (6-3) are used for the purpose of adjusting the threshold voltage of the liquid crystal composition.

The compounds of formulas (7-1) and (7-2) are characterized in that a dielectric anisotropy is approximately zero and a viscosity is low. Thus the compounds of formulas (7-1) and (7-2) are used for the purpose of adjusting the threshold voltage and viscosity of the liquid crystal composition.

A preferable component ratio of the compound constituting the liquid crystal composition of the invention and the reason therefor will be explained below.

Incorporating a large quantity of the compounds of formulas (1-1) and (1-2) into the liquid crystal composition may result in raising the lower-limit temperature of a nematic phase in the liquid crystal composition. For this reason, it is desirable that the compounds of formulas (1-1) and (1-2) constitute not more than 50% by weight, preferably not more than 45% by weight, of the liquid crystal composition. Further, it is desirable that the compounds of formulas (1-1) and (1-2) constitute not less than 5% by weight, preferably not less than 10% by weight, of the liquid crystal composition for the reasons of reducing the threshold voltage and further reducing the temperature dependence of threshold voltage while keeping a stability of the liquid crystal composition to heat or ultraviolet high.

Incorporating a large quantity of the compounds of formula (2) into the liquid crystal composition may result in raising the lower-limit temperature of a nematic phase in the liquid crystal composition. For this reason, it is desirable that the compounds of formula (2) constitute not more than 60% by weight, preferably not more than 55% by weight, of the liquid crystal composition. Further, it is desirable that the compounds of formulas (2) constitute not less than 5% by weight, preferably not less than 10% by weight, of the liquid crystal composition in order to reduce more the threshold voltage of the liquid crystal composition.

Incorporating a large quantity of the compounds of formulas (3-1) and (3-2) into the liquid crystal composition may result in raising the threshold voltage of the liquid crystal composition. For this reason, it is desirable that the compounds of formulas (3-1) and (3-2) constitute not more than 50% by weight, preferably not more than 45% by weight, of the liquid crystal composition. Further, it is is desirable that the compounds of formulas (3-1) and (3-2) constitute not less than 10% by weight, preferably not less than 15% by weight, of the liquid crystal composition in order to reduce the viscosity of the liquid crystal composition and improve the steepness.

Incorporating a large quantity of the compounds of formulas (4-1) to (4-3) into the liquid crystal composition may result in raising the threshold voltage of the liquid crystal composition. For this reason, it is desirable that the compounds of formulas (4-1) to (4-3) constitute not more than 30% by weight, preferably not-more than 25% by weight, of the liquid crystal composition. Further, it is desirable that the compounds of formulas (4-1) to (4-3) constitute not less than 5% by weight of the liquid crystal composition in order to adjust the optical anisotropy of the liquid crystal composition to a moderate value.

Incorporating a large quantity of the compounds of formula (5) into the liquid crystal composition may result in raising the lower-limit temperature of a nematic phase in the liquid crystal composition. For this reason, it is desirable that the compounds of formula (5) constitute not more than 35% by weight, preferably 5 to 30% by weight, of the liquid crystal composition.

Incorporating a large quantity of the compounds of formulas (6-1) to (6-3) into the liquid crystal composition may result in raising the lower-limit temperature of a nematic phase in the liquid crystal composition. For this reason, it is desirable that the compounds of formulas (6-1) to (6-3) constitute not more than 30% by weight, preferably 5 to 25% by weight, of the liquid crystal composition.

Incorporating a large quantity of the compounds of formulas (7-1) and (7-2) into the liquid crystal composition may result in raising the threshold voltage of the liquid crystal composition. For this reason, it is desirable that the compounds of formulas (7-1) and (7-2) constitute not more than 30% by weight, preferably 5 to 25% by weight, of the liquid crystal composition.

Each of the compounds constituting the composition of the present invention can be synthesized by the prior art processes.

Of the compounds of formulas (1-1) and (1-2), the method of synthesizing those of formulas (1-1-1) and (1-2-1) is disclosed in WO96/11897.

Of the compounds of formula (2), the method of synthesizing those of formulas (2-2) and (2-7), respectively is disclosed in Japanese Patent Kokai 59-176240 and 4-300861.

Of the compounds of formulas (3-1) and (3-2), the method of synthesizing those of formulas (3-1-2) and (3-2-2) is disclosed in Japanese Patent Kokai 1-308239.

Of the compounds of formula (4-1), the method of synthesizing those of formula (4-1-1) is disclosed in Japanese Patent Kokai 61-5031. Of the compounds of formula (4-2), the method of synthesizing those of formula (4-2-1) is disclosed in Japanese Patent Kokai 63-152334. The method of synthesizing the compounds of formula (4-3), e.g. those of formula (4-3-2) is disclosed in Japanese Patent Kokai 2-237949.

Of the compounds of formula (5), the method of synthesizing those of formula (5-1) is disclosed in Japanese Patent Kokai 58-10552.

Of the compounds of formula (6-1), the method of synthesizing those of formula (6-1-2) is disclosed in Japanese Patent Kokai 2-233626. Of the compounds of formula (6-2), the method of synthesizing those of formula (6-2-1) is disclosed in Japanese Patent Kokai 56-135445. Of the compounds of formula (6-3), the method of synthesizing those of formula (6-3-1) is disclosed in Japanese Patent Kokai 59-216876.

Of the compounds of formula (7-1), the method of synthesizing those of formula (7-1-1) is disclosed in Japanese Patent Kokai 59-70624. Of the compounds of formula (7-2), the method of synthesizing those of formula (7-2-1) is disclosed in Japanese Patent Kokai 57-165328.

Other liquid crystalline compounds than each compound represented by the above-mentioned formula can be used in admixture therewith in the liquid crystal composition within the range of not injuring the object of the present invention. To the liquid crystal composition of the invention may be added chiral dopants for the purpose of inducing the helical structure of liquid crystal molecules to adjust necessary twist angle. The liquid crystal composition of the invention can be also used as a liquid crystal composition for guest-host (GH) mode by incorporating therein dichroic dyes such as merocyanines, styryl derivatives, azo compounds, azomethines, azoxy compounds, quinophthalones, anthraquinones and tetrazine derivatives, etc. Further, the liquid crystal composition of the invention can be used as a liquid crystal composition for a polymer-dispersed liquid crystal display and for an electrically controlled birefringence (ECB) mode and a dynamic scattering (DS) mode.

The liquid crystal composition of the invention is prepared by a process conventional per se. In general, a process can be employed wherein various compounds are mixed and dissolved each other at an elevated temperature.

This invention is further illustrated by the following examples and comparative examples in which all parts and percentages (%) are by weight unless otherwise indicated.

Further, the compounds used in the examples and comparative examples are expressed by the symbols as shown below.

Indication of the compounds using the symbols
R—(A₁)—Z₁—. . .—Z_n—(A_n)—X

| | Symbol |
|---|---|
| 1) Left terminal group R— | |
| $C_nH_{2n+1}$— | n- |
| $C_nH_{2n+1}CH=CHC_mH_{2m}$— | nVm- |
| $C_nH_{2n+1}OC_mH_{2m}$— | nOm- |
| $CH_2=CHC_nH_{2n}$— | Vn- |
| $CH_2=CH$— | V- |
| $C_nH_{2n+1}CH=CH$— | nV- |
| $CF_2=CH$— | VFF- |
| $CF_2=CHC_nH_{2n}$— | VFFn- |
| 2) Ring structure —(A₁)—, —(A_n)— | |

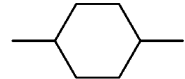

H

B

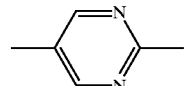

Py

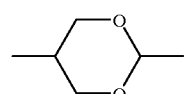

D

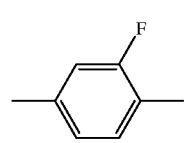

B(F)

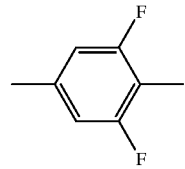

B(F,F)

3) Linking group —Z₁—, —Z_n—

| | |
|---|---|
| —$CH_2CH_2$— | 2 |
| —COO— | E |
| —C≡C— | T |
| —$CF_2O$— | CF2O |
| 4) Right terminal group —X | |
| —CN | —C |
| —$OC_nH_{2n+1}$ | -On |
| —F | —F |
| —$C_nH_{2n+1}$ | -n |
| —Cl | -CL |
| —$CH=CH_2$ | -V |
| —$CH=CF_2$ | -VFF |
| 5) Example of indication | |

3-HBCF2OB(F,F)—C

-continued

Indication of the compounds using the symbols
R—(A₁)—Z₁—...—Zₙ—(Aₙ)—X

Symbol

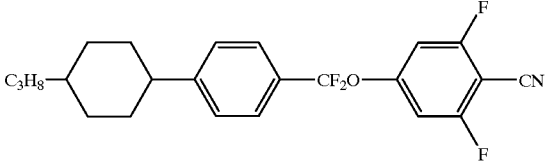

1V2-BEB(F,F)—C

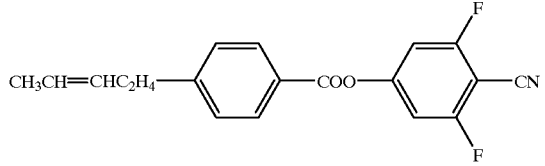

For the characteristics of the liquid crystal composition, the upper limit of the nematic phase temperature range was expressed as $T_{NI}$, the lower limit of the nematic phase temperature range was expressed as $T_c$, the viscosity was expressed as η, the optical anisotropy was expressed as Δn, the threshold voltage was expressed as Vth, the temperature dependence of threshold voltage was expressed as δ, the stability to heat was expressed as dH, the stability to ultraviolet rays was expressed as dUV and the steepness in a T-V curve was expressed as γ.

$T_{NI}$ was determined by measuring the temperature of a nematic-isotropic phase transition during the temperature rising process using a polarization microscope. $T_c$ was judged by a liquid crystal phase which appeared after the liquid crystal composition was allowed to stand for 30 days in a freezer at 0° C., –10° C., –20° C., –30° C. and –40° C., respectively. For example, when a liquid crystal composition is in a nematic state at –20° C., and in a crystallized or smectic state at –30° C., $T_c$ of the liquid crystal composition was expressed as <–20° C. η was measured at 20° C. An was measured at 25° C. by using a lamp with a wavelength of 589 nm for light source. Vth was measured at 25° C.

δ was determined from the following equation (A) using Vth measured at 20° C. and 50° C. A smaller value of δ means smaller temperature dependence of threshold voltage.

$$\delta \text{ (V/°C.)} = (Vth20 - Vth50)/(50° \text{ C.} - 20° \text{ C.}) \tag{A}$$

in which Vth50 represents Vth at 50° C. and Vth20 represents Vth at 20° C. Vth at 20° C., 25° C. and 50° C. refers to the value of voltage applied when a rectangular wave having a frequency of 32 Hz is applied in the normally white mode using a cell having a thickness of 9.0 μm and a twist angle of 80° and a transmittance of light passing through the cell becomes 90%.

dH was determined from the following equation (B). Smaller dH means higher stability to heat.

$$dH \text{ (}\mu A\text{)} = Iha \text{ (}\mu A\text{)} - Ihb \text{ (}\mu A\text{)} \tag{B}$$

in which Iha represents an electric current value flowing in a liquid crystal composition after heating and Ihb represents an electric current value flowing in a liquid crystal composition before heating. The liquid crystal composition was heated in an air at 150° C. for one hour. The electric current value was determined by pouring the liquid crystal composition into a TN cell having a thickness of 10 μm and an electrode area of 1 cm² and two opposite glass substrates deposited diagonally with silicon dioxide and applying a rectangular wave of 3 V and 32 Hz to the cell.

The electric current was measured at 25° C. dUV was determined from the following equation (C). Smaller dUV means higher stability to ultraviolet rays.

$$dUV \text{ (}\mu A\text{)} = Iuva \text{ (}\mu A\text{)} - Iuvb \text{ (}\mu A\text{)} \tag{C}$$

in which Iuva represents an electric current value flowing in a liquid crystal composition after exposure to ultraviolet rays and Iuvb represents an electric current value flowing in a liquid crystal composition before exposure to ultraviolet rays. The exposure of the liquid crystal composition to ultraviolet rays was carried out by exposing the cell for evaluation which contains the liquid crystal composition, for 20 minutes, to ultraviolet rays emitted from an extra-high pressure mercury lump (manufactured by Ushio Electric Inc.) having an energy of 12 mW/cm², with a distance between a light source and an object being 20 cm. The electric current value was measured in a similar manner as mentioned above.

γ was determined from the following equation (D). More approach of γ to 1 means better steepness.

$$\gamma = V20/V80 \tag{D}$$

in which V20 and V80 refer to the value of voltage applied when a transmittance of light passing through the cell in the normally yellow mode becomes 20% and 80%, respectively. The measurement of V20 and V80 was carried out by using a cell having a twist angle of 240° and a thickness of (0.80/Δn) μm and applying a rectangular wave having a frequency of 70 Hz at 25° C. The liquid crystal composition used in the measurement of V20 and V80 was prepared by adding cholesteryl nonanoate based on 100 parts of the liquid crystal composition so that a ratio (d/P) of cell thickness d and pitch length P in the twist becomes 0.50.

COMPARATIVE EXAMPLE 1

The composition (Example 5) with the lowest threshold voltage of the compositions disclosed in Japanese Patent Kokai 7-300582 was prepared as follows:

| | |
|---|---|
| 4O1-BEB(F)—C | 8% |
| 1O1-HBEB(F)—C | 5% |
| 3-H2B(F)EB(F)—C | 7% |
| 3-HB—C | 8% |
| 1O1-HB—C | 7% |
| 3-HHB(F,F)—F | 10% |
| 2-HBB—F | 5% |
| 3-HBB—F | 5% |
| 1O1-HH-3 | 8% |
| 1O1-HH-5 | 7% |
| 3-HHB-3 | 14% |
| 2-BTB-1 | 4% |
| 1-BTB-6 | 8% |
| 4-BTB-4 | 4% |

The above composition had the following characteristics:
$T_{NI}$=70° C.
$T_c$<–30° C.

η=24.3 mPa·s
Δn=0.127
Vth=1.40 V
δ=0.005 V/° C.
dH=1.95 μA
dUV=5.80 μA

A liquid crystal composition prepared by adding 1.60 parts by weight of cholesteryl nonanoate to 100 parts by weight of the above liquid crystal composition had 1.118 of γ. This composition had poor stability to heat and ultraviolet rays and poor steepness.

COMPARATIVE EXAMPLE 2

The composition (Example 6) with the lowest threshold voltage of the compositions disclosed in Japanese Patent Kokai 7-300585 was prepared as follows:

| | |
|---|---|
| 5O1-HBEB(F)—C | 10% |
| 1V2-BEB(F,F)—C | 10% |
| 2-HEB—C | 8% |
| 3-HEB—C | 4% |
| 2-HBB—F | 5% |
| 3-HBB—F | 5% |
| 5-PyB(F)—F | 7% |
| 3-HHB(F,F)—F | 10% |
| 3-HH-4 | 10% |
| 3-HB—O2 | 10% |
| 3-HHB-1 | 6% |
| 3-HB(F)TB-2 | 8% |
| 3-HB(F)TB-3 | 7% |

The above composition had the following characteristics:
$T_{NI}$=77.8° C.
$T_c$<−30° C.
η=31.0 mPa·s
Δn=0.140
Vth=1.17 V
δ=0.003 V/°C.
dH=1.75 μA
dUV=4.95 μA A liquid crystal composition prepared by adding 1.40 parts by weight of cholesteryl nonanoate to 100 parts by weight of the above liquid crystal composition had 1.125 of γ. This composition had poor stability to heat and ultraviolet rays and poor steepness.

COMPARATIVE EXAMPLE 3

The composition (Example 5) with the lowest threshold voltage of the compositions disclosed in Japanese Patent Kokai 7-300584 was prepared as follows:

| | |
|---|---|
| 3O1-BEB(F)—C | 8% |
| 5O1-HBEB(F)—C | 8% |
| V2-HB—C | 7% |
| 1V2-HB—C | 7% |
| 2-BEB—C | 8% |
| 3-BEB—C | 4% |
| 3-HHB(F,F)—F | 10% |
| 5-HEB—F | 5% |
| 7-HEB—F | 5% |
| 3-HH-4 | 10% |
| 2-BTB—O1 | 8% |
| 3-H2BTB-2 | 5% |
| 3-H2BTB-3 | 5% |
| 3-HB(F)TB-2 | 5% |
| 3-HB(F)TB-3 | 5% |

The above composition had the following characteristics:
$T_{NI}$=73.4° C.
$T_c$<−30° C.
η=28.0 mPa·s
η=0.151
Vth=1.33 V
δ=0.004 V/°C.
dH=2.03 μA
dUV=5.37 μA A liquid crystal composition prepared by adding 1.68 parts by weight of cholesteryl nonanoate to 100 parts by weight of the above liquid crystal composition had 1.112 of γ. This composition had poor stability to heat and ultraviolet rays and poor steepness.

COMPARATIVE EXAMPLE 4

The composition illustrated in Composition Example 19 which is the composition containing the compounds of formula (1-2) among the compositions disclosed in WO 96/11897 was prepared as follows:

| | |
|---|---|
| 3-HBCF2OB(F,F)—C | 6% |
| 5-HBCF2OB(F,F)—C | 6% |
| 3-HB(F,F)CF2OB—C | 6% |
| 5-HB(F,F)CF2OB—C | 6% |
| 2O1-BEB(F)—C | 2% |
| 3O1-BEB(F)—C | 8% |
| 2-HB(F)—C | 5% |
| 3-HB(F)—C | 7% |
| 3-HHB(F)—C | 3% |
| 2-HHB(F)—F | 5% |
| 3-HHB(F)—F | 5% |
| 5-HHB(F)—F | 5% |
| 3-H2BTB-2 | 4% |
| 3-H2BTB-3 | 4% |
| 3-H2BTB-4 | 4% |
| 3-HB(F)TB-2 | 4% |
| 3-HB(F)TB-3 | 4% |
| 3-HB(F)TB-4 | 4% |
| 3-HHB-1 | 6% |
| 3-HHB-3 | 3% |
| 3-HHB—O1 | 3% |

The above composition had the following characteristics:
$T_{NI}$=97.7° C.
$T_c$<−20° C.
η=38.4 mPa·s
Δn=0.141
Vth=1.52 V
δ=0.013 V/° C.
dH=0.05 μA
dUV=0.10 μA A liquid crystal composition prepared by adding 1.70 parts by weight of cholesteryl nonanoate to 100 parts by weight of the above liquid crystal composition had 1.113 of γ. This composition had high threshold voltage, large temperature dependence of threshold voltage and poor steepness.

EXAMPLE 1

The following liquid crystal composition comprising the following compounds was prepared.

| Compounds of formula (1-1) or (1-2): | |
|---|---|
| 2-BCF2OB(F,F)—C | 5% |
| 3-BCF2OB(F,F)—C | 6% |
| 4-BCF2OB(F,F)—C | 5% |
| 2-HBCF2OB(F,F)—C | 5% |
| 3-HBCF2OB(F,F)—C | 5% |
| 4-HBCF2OB(F,F)—C | 4% |
| Compounds of formula (2): | |
| 3-HB—C | 25% |
| Compounds of formula (3-1) or (3-2): | |
| VFF—HHB-1 | 9% |
| VFF2-HHB-1 | 21% |
| Compounds of formulas (4-1) to (4-3): | |
| 3-HB(F)TB-2 | 4% |
| 1O1-HBBH-4 | 4% |
| 1O1-HBBH-5 | 7% |

The above composition had the following characteristics:

$T_{NI}$=86.6° C.

$T_c$<−30° C.

η=30.4 mPa•s

Δn=0.127

Vth=1.28 V

δ=0.002 V/°C.

dH=0.03 μA dUV=0.04 μA

A liquid crystal composition prepared by adding 1.86 parts by weight of cholesteryl nonanoate to 100 parts by weight of the above liquid crystal composition had 1.040 of γ. This composition had excellent steepness, low threshold voltage, low temperature dependence of threshold voltage and high stability to heat and ultraviolet rays.

EXAMPLE 2

The following liquid crystal composition comprising the following compounds was prepared.

| Compounds of formula (1-1) or (1-2): | |
|---|---|
| 2-BCF2OB(F,F)—C | 5% |
| 3-BCF2OB(F,F)—C | 6% |
| 4-BCF2OB(F,F)—C | 5% |
| 2-HBCF2OB(F,F)—C | 5% |
| 3-HBCF2OB(F,F)—C | 5% |
| 4-HBCF2OB(F,F)—C | 4% |
| 3-DBCF2OB(F,F)—C | 5% |
| Compounds of formula (2): | |
| 3-HB—C | 20% |
| Compounds of formula (3-1) or (3-2): | |
| V—HHB-1 | 5% |
| V2-HHB-1 | 4% |
| VFF2-HHB-1 | 21% |
| Compounds of formulas (4-1) to (4-3): | |
| 3-H2BTB-2 | 4% |
| 5-HBBH-3 | 4% |
| 1O1-HBBH-5 | 7% |

The above composition had the following characteristics:

$T_{NI}$=89.8° C.

$T_c$<−30° C.

η=30.4 mPa•s

Δn=0.127

Vth=1.23 V

δ=0.002 V/°C.

dH=0.04 μA dUV=0.02 μA

A liquid crystal composition prepared by adding 1.87 parts by weight of cholesteryl nonanoate to 100 parts by weight of the above liquid crystal composition had 1.038 of γ. This composition had excellent steepness, low threshold voltage, low temperature dependence of threshold voltage and high stability to heat and ultraviolet rays.

EXAMPLE 3

The following liquid crystal composition comprising the following compounds was prepared.

| Compounds of formula (1-1) or (1-2): | |
|---|---|
| 3-BCF2OB(F,F)—C | 5% |
| 3-HBCF2OB(F,F)—C | 5% |
| Compounds of formula (2): | |
| 1V2-BEB(F,F)—C | 19% |
| 1V2-HB—C | 10% |
| 3-HB—C | 23% |
| Compounds of formula (3-1) or (3-2): | |
| VFF—HHB-1 | 5% |
| VFF2-HHB-1 | 16% |
| Compounds of formulas (4-1) to (4-3): | |
| 3-HB(F)TB-2 | 4% |
| 3-HB(F)TB-3 | 4% |
| 5-HBB(F)B-2 | 3% |
| 1O1-HBBH-5 | 6% |

The above composition had the following characteristics:

$T_{NI}$=83.0° C.

$T_c$<−30° C.

η=31.0 mPa•s

Δn=0.150

Vth=1.20 V

δ=0.002 V/°C.

dH=0.03 μA dUV=0.02 μA

A liquid crystal composition prepared by adding 1.92 parts by weight of cholesteryl nonanoate to 100 parts by weight of the above liquid crystal composition had 1.060 of γ. This composition had excellent steepness, low threshold voltage, low temperature dependence of threshold voltage and high stability to heat and ultraviolet rays.

EXAMPLE 4

The following liquid crystal composition comprising the following compounds was prepared.

| Compounds of formula (1-1) or (1-2): | |
|---|---|
| 3-BCF2OB(F,F)—C | 5% |
| 3-HBCF2OB(F,F)—C | 5% |
| Compounds of formula (2): | |
| 1V2-BEB(F,F)—C | 4% |
| 3-BEB(F,F)—C | 5% |
| 3-H2B(F,F)—C | 5% |
| 3-HEB(F,F)—C | 5% |
| 1V2-HB—C | 10% |
| 3-HB—C | 18% |
| 3-HB(F)—C | 5% |
| Compounds of formula (3-1) or (3-2): | |
| VFF—HHB-1 | 5% |
| VFF2-HHB-1 | 16% |
| Compounds of formulas (4-1) to (4-3): | |
| 3-HB(F)TB-2 | 4% |
| 5-HBB(F)B-2 | 3% |
| 1O1-HBBH-4 | 4% |
| 1O1-HBBH-5 | 6% |

The above composition had the following characteristics:

$T_{NI}$=80.2° C.

$T_c$<−30° C.

$\eta$=31.7 mPa·s $\Delta n$=0.136

Vth=1.25 V $\delta$=0.002 V/°C.

dH=0.02 $\mu$A dUV=0.04 $\mu$A

A liquid crystal composition prepared by adding 1.90 parts by weight of cholesteryl nonanoate to 100 parts by weight of the above liquid crystal composition had 1.057 of $\gamma$. This composition had excellent steepness, low threshold voltage, low temperature dependence of threshold voltage and high stability to heat and ultraviolet rays.

EXAMPLE 5

The following liquid crystal composition comprising the following compounds was prepared.

| Compounds of formula (1-1) or (1-2): | |
|---|---|
| 3-HBCF2OB(F,F)—C | 6% |
| 4-HBCF2OB(F,F)—C | 5% |
| 5-HBCF2OB(F,F)—C | 5% |
| Compounds of formula (2): | |
| 3O1-BEB(F)—C | 10% |
| 3-HB—C | 20% |
| 3-HB(F,F)—C | 5% |
| Compounds of formula (3-1) or (3-2): | |
| 5-HH—VFF | 15% |
| VFF—HHB-1 | 6% |
| VFF2-HHB-1 | 9% |
| Compounds of formulas (4-1) to (4-3): | |
| 3-HB(F)TB-2 | 7% |
| 3-HB(F)TB-3 | 6% |
| 3-HB(F)TB-4 | 6% |

The above composition had the following characteristics:

$T_{NI}$=83.4° C.

$T_c$<−30° C.

$\eta$=23.3 mPa·s $\Delta n$=0.138

Vth=1.30 V $\delta$=0.003 V/°C.

dH=0.04 $\mu$A dUV=0.03 $\mu$A

A liquid crystal composition prepared by adding 1.90 parts by weight of cholesteryl nonanoate to 100 parts by weight of the above liquid crystal composition had 1.043 of $\gamma$. This composition had excellent steepness, low threshold voltage, low temperature dependence of threshold voltage and high stability to heat and ultraviolet rays.

EXAMPLE 6

The following liquid crystal composition comprising the following compounds was prepared.

| Compounds of formula (1-1) or (1-2): | |
|---|---|
| 2-HBCF2OB(F,F)—C | 6% |
| 3-HBCF2OB(F,F)—C | 6% |
| 4-HBCF2OB(F,F)—C | 6% |
| 5-HBCF2OB(F,F)—C | 6% |
| Compounds of formula (2): | |
| 3-BEB(F)—C | 5% |
| 4-BEB(F)—C | 5% |
| 5-BEB(F)—C | 4% |
| 3-HB—C | 10% |
| 1V2-BEB(F,F)—C | 10% |
| Compounds of formula (3-1) or (3-2): | |
| V2-HH—VFF | 10% |
| VFF—HHB-1 | 9% |
| VFF2-HHB-1 | 18% |
| Compounds of formulas (4-1) to (4-3): | |
| 3-H2BTB-2 | 5% |

The above composition had the following characteristics:

$T_{NI}$=77.5° C.

$T_c$<−30° C.

$\eta$=29.5 mPa·s $\Delta n$=0.126

Vth=1.20 V $\delta$=0.004 V/°C.

dH=0.03 $\mu$A dUV=0.03 $\mu$A

A liquid crystal composition prepared by adding 2.00 parts by weight of cholesteryl nonanoate to 100 parts by weight of the above liquid crystal composition had 1.038 of $\gamma$. This composition had excellent steepness, low threshold voltage, low temperature dependence of threshold voltage and high stability to heat and ultraviolet rays.

EXAMPLE 7

The following liquid crystal composition comprising the following compounds was prepared.

| Compounds of formula (1-1) or (1-2): | |
|---|---|
| 3-BCF2OB(F,F)—C | 3% |
| 4-BCF2OB(F,F)—C | 3% |
| 3-HBCF2OB(F,F)—C | 6% |
| 4-HBCF2OB(F,F)—C | 5% |
| 5-HBCF2OB(F,F)—C | 5% |
| Compounds of formula (2): | |
| 1V2-BEB(F,F)—C | 10% |
| 1V2-HB—C | 10% |
| 3-HB—C | 13% |
| 3-BEB—C | 5% |
| Compounds of formula (3-1) or (3-2): | |
| 5-HH—V | 5% |
| VFF2-HHB-1 | 19% |
| Compounds of formulas (4-1) to (4-3): | |
| 2-BTB-1 | 3% |
| 2-BTB—O1 | 3% |
| 1O1-HBBH-4 | 5% |
| 1O1-HBBH-5 | 5% |

The above composition had the following characteristics:

$T_{NI}$=81.5° C.

$T_c$<-30° C.

η=29.7 mPa•s

Δn=0.139

Vth=1.31 V

δ=0.002 V/°C.

dH=0.02 μA dUV=0.03 μA

A liquid crystal composition prepared by adding 1.77 parts by weight of cholesteryl nonanoate to 100 parts by weight of the above liquid crystal composition had 1.060 of γ. This composition had excellent steepness, low threshold voltage, low temperature dependence of threshold voltage and high stability to heat and ultraviolet rays.

EXAMPLE 8

The following liquid crystal composition comprising the following compounds was prepared.

| Compounds of formula (1-1) or (1-2): | |
|---|---|
| 2-BCF2OB(F,F)—C | 5% |
| 3-BCF2OB(F,F)—C | 5% |
| 4-BCF2OB(F,F)—C | 5% |
| 5-BCF2OB(F,F)—C | 5% |
| 2-HBCF2OB(F,F)—C | 5% |
| 3-HBCF2OB(F,F)—C | 5% |
| Compounds of formula (2): | |
| 2O1-BEB(F,F)—C | 6% |
| 3-HB(F)—C | 5% |
| Compounds of formula (3-1) or (3-2): | |
| 5-HH—VFF | 15% |
| VFF—HHB-1 | 3% |
| Compounds of formulas (4-1) to (4-3): | |
| 3-HB(F)TB-2 | 7% |
| 3-HB(F)TB-3 | 6% |
| Compounds of formula (5): | |
| 2-HHB—C | 3% |
| 3-HHB—C | 3% |
| 2-HHB(F)—C | 8% |
| 3-HHB(F)—C | 14% |

The above composition had the following characteristics:

$T_{NI}$=80.7° C.

$T_c$<-30° C.

η=38.0 mPa•s

Δn=0.128

Vth=1.15 V

δ=0.002 V/°C.

dH=0.04 μA dUV=0.03 μA

A liquid crystal composition prepared by adding 1.53 parts by weight of cholesteryl nonanoate to 100 parts by weight of the above liquid crystal composition had 1.037 of γ. This composition had excellent steepness, low threshold voltage, low temperature dependence of threshold voltage and high stability to heat and ultraviolet rays.

EXAMPLE 9

The following liquid crystal composition comprising the following compounds was prepared.

| Compounds of formula (1-1) or (1-2): | |
|---|---|
| 2-BCF2OB(F,F)—C | 5% |
| 3-BCF2OB(F,F)—C | 5% |
| 4-BCF2OB(F,F)—C | 5% |
| 2-HBCF2OB(F,F)—C | 5% |
| 3-HBCF2OB(F,F)—C | 5% |
| 4-HBCF2OB(F,F)—C | 5% |
| Compounds of formula (2): | |
| 3-HB—C | 20% |
| Compounds of formula (3-1) or (3-2): | |
| VFF—HHB-1 | 5% |
| VFF2-HHB-1 | 18% |
| Compounds of formulas (4-1) to (4-3): | |
| 3-H2BTB-2 | 5% |
| 3-H2BTB-3 | 5% |
| Compounds of formulas (6-1) to (6-3): | |
| 2-HBEB(F,F)—F | 3% |
| 3-HBEB(F,F)—F | 5% |
| 5-HBEB(F,F)—F | 3% |
| 3-HHEB—F | 3% |
| 5-HHEB—F | 3% |

The above composition had the following characteristics:

$T_{NI}$=82.3° C.

$T_c$<-30° C.

η=31.5 mPa•s

Δn=0.127

Vth=1.19 V

δ=0.002 V/°C.

dH=0.02 μA dUV=0.04 μA

A liquid crystal composition prepared by adding 1.71 parts by weight of cholesteryl nonanoate to 100 parts by weight of the above liquid crystal composition had 1.062 of γ. This composition had excellent steepness, low threshold voltage, low temperature dependence of threshold voltage and high stability to heat and ultraviolet rays.

EXAMPLE 10

The following liquid crystal composition comprising the following compounds was prepared.

| Compounds of formula (1-1) or (1-2): | |
|---|---|
| 2-BCF2OB(F,F)—C | 5% |
| 3-BCF2OB(F,F)—C | 5% |
| 4-BCF2OB(F,F)—C | 5% |
| 5-BCF2OB(F,F)—C | 5% |
| 2-HBCF2OB(F,F)—C | 4% |
| 3-HBCF2OB(F,F)—C | 3% |
| Compounds of formula (2): | |
| 3-HB—C | 20% |
| Compounds of formula (3-1) or (3-2): | |
| VFF—HHB-1 | 8% |
| VFF2-HHB-1 | 17% |
| Compounds of formulas (4-1) to (4-3): | |
| 3-H2BTB-2 | 4% |
| 3-H2BTB-3 | 4% |
| 3-H2BTB-4 | 4% |
| Compounds of formula (7-1) or (7-2): | |
| 3-HHB—CL | 4% |
| 3-HHB-1 | 4% |
| 3-HHB—O1 | 4% |
| 3-HHB—F | 4% |

The above composition had the following characteristics:

$T_{NI}$=81.2° C.

$T_c$<−20° C.

η=18.6 mPa•s

Δn=0.125

Vth=1.33 V

δ=0.002 V/°C.

dH=0.03 µA dUV=0.02 µA

A liquid crystal composition prepared by adding 2.02 parts by weight of cholesteryl nonanoate to 100 parts by weight of the above liquid crystal composition had 1.050 of γ. This composition had excellent steepness, low threshold voltage, low temperature dependence of threshold voltage and high stability to heat and ultraviolet rays.

EXAMPLE 11

The following liquid crystal composition comprising the following compounds was prepared.

| Compounds of formula (1-1) or (1-2): | |
|---|---|
| 2-BCF2OB(F,F)-C | 5% |
| 3-BCF2OB(F,F)-C | 5% |
| 4-BCF2OB(F,F)-C | 5% |
| 5-BCF2OB(F,F)-C | 5% |
| 3-HBCF2OB(F,F)-C | 5% |
| 4-HBCF2OB(F,F)-C | 5% |

-continued

| Compounds of formula (2): | |
|---|---|
| 3O1-BEB(F)-C | 4% |
| 3-HB(F)-C | 12% |
| Compounds of formula (3-1) or (3-2): | |
| VFF-HHB-1 | 7% |
| VFF2-HHB-1 | 12% |
| Compounds of formulas (4-1) to (4-3): | |
| 3-HB(F)TB-2 | 7% |
| 3-HB(F)TB-3 | 6% |
| Compounds of formula (5): | |
| 3-HHB(F)-C | 10% |
| Compounds of formulas (6-1) to (6-3): | |
| 3-HHEB-F | 6% |
| 3-HHB(F)-F | 6% |

The above composition had the following characteristics:

$T_{NI}$=81.6° C.

$T_c$<−20° C.

η=34.4 mPa•s

Δn=0.126

Vth=1.20 V

δ=0.002 V/°C.

dH=0.02 µA dUV=0.02 µA

A liquid crystal composition prepared by adding 1.52 parts by weight of cholesteryl nonanoate to 100 parts by weight of the above liquid crystal composition had 1.052 of γ. This composition had excellent steepness, low threshold voltage, low temperature dependence of threshold voltage and high stability to heat and ultraviolet rays.

EXAMPLE 12

The following liquid crystal composition comprising the following compounds was prepared.

| Compounds of formula (1-1) or (1-2): | |
|---|---|
| 2-HBCF2OB(F,F)-C | 5% |
| 3-HBCF2OB(F,F)-C | 5% |
| 4-HBCF2OB(F,F)-C | 5% |
| 5-HBCF2OB(F,F)-C | 5% |
| Compounds of formula (2): | |
| 3-HB(F)-C | 13% |
| 3-HB-C | 21% |
| Compounds of formula (3-1) or (3-2): | |
| 5-HH-VFF | 19% |
| Compounds of formulas (4-1) to (4-3): | |
| 2-BTB-1 | 6% |
| Compounds of formula (5): | |
| 2-HHB-C | 5% |
| 3-HHB-C | 5% |
| 4-HHB-C | 5% |
| Compounds of formula (7-1) or (7-2): | |
| 3-HHB-1 | 6% |

The above composition had the following characteristics:

$T_{NI}$=81.4° C.

$T_c$<−20° C.

$\eta$=24.1 mPa·s $\Delta$n=0.125

Vth=1.31 V $\delta$=0.004 V/°C.

dH=0.04 $\mu$A dUV=0.03 $\mu$A

A liquid crystal composition prepared by adding 1.87 parts by weight of cholesteryl nonanoate to 100 parts by weight of the above liquid crystal composition had 1.041 of $\gamma$. This composition had excellent steepness, low threshold voltage, low temperature dependence of threshold voltage and high stability to heat and ultraviolet rays.

EXAMPLE 13

The following liquid crystal composition comprising the following compounds was prepared.

| Compounds of formula (1-1) or (1-2): | |
|---|---|
| 2-BCF2OB(F,F)-C | 6% |
| 3-BCF2OB(F,F)-C | 6% |
| Compounds of formula (2): | |
| 3O1-BEB(F)-C | 5% |
| 1V2-BEB(F,F)-C | 14% |
| 3-HB-C | 3% |
| Compounds of formula (3-1) or (3-2): | |
| 5-HH-VFF | 10% |
| VFF-HHB-1 | 6% |
| VFF2-HHB-1 | 10% |
| Compounds of formulas (4-1) to (4-3): | |
| 3-HB(F)TB-2 | 5% |
| 3-HB(F)TB-3 | 4% |
| Compounds of formulas (6-1) to (6-3): | |
| 3-HHEB-F | 5% |
| 5-HHEB-F | 5% |
| 3-HBEB-F | 6% |
| Compounds of formula (7-1) or (7-2): | |
| 3-HB-O2 | 7% |
| 3-HHB-1 | 5% |
| 3-HHB-O1 | 3% |

The above composition had the following characteristics:

$T_{NI}$=80.5° C.

$T_c$<−30° C.

$\eta$=26.4 mPa·s $\Delta$n=0.123

Vth=1.23 V $\delta$=0.002 V/°C.

dH=0.03 $\mu$A dUV=0.02 $\mu$A

A liquid crystal composition prepared by adding 1.48 parts by weight of cholesteryl nonanoate to 100 parts by weight of the above liquid crystal composition had 1.043 of $\gamma$. This composition had excellent steepness, low threshold voltage, low temperature dependence of threshold voltage and high stability to heat and ultraviolet rays.

EXAMPLE 14

The following liquid crystal composition

| Compounds of formula (1-1) or (1-2): | |
|---|---|
| 2-HBCF2OB(F,F)-C | 4% |
| 3-HBCF2OB(F,F)-C | 5% |
| 4-HBCF2OB(F,F)-C | 4% |
| Compounds of formula (2): | |
| V2-HB-C | 10% |
| 1V2-HB-C | 10% |
| 1V2-BEB(F,F)-C | 11% |
| Compounds of formula (3-1) or (3-2): | |
| 3-HH-VFF | 16% |
| Compounds of formulas (4-1) to (4-3): | |
| 3-HB(F)TB-2 | 4% |
| 3-HB(F)TB-3 | 4% |
| Compounds of formula (5): | |
| 3-HHB-C | 5% |
| Compounds of formulas (6-1) to (6-3): | |
| 3-HHB(F,F)-F | 5% |
| 3-HHEB(F,F)-F | 2% |
| 3-PyBB-F | 4% |
| Compounds of formula (7-1) or (7-2): | |
| 3-HHB-1 | 4% |
| 3-HHB-O1 | 5% |
| 3-HH-4 | 5% |
| 3-HB-O2 | 2% |

The above composition had the following characteristics:

$T_{NI}$=85.7° C.

$T_c$<−30° C.

$\eta$=21.2 mPa·s $\Delta$n=0.127

Vth=1.33 V $\delta$=0.002 V/°C.

dH=0.02 $\mu$A dUV=0.02 $\mu$A

A liquid crystal composition prepared by adding 1.88 parts by weight of cholesteryl nonanoate to 100 parts by weight of the above liquid crystal composition had 1.035 of $\gamma$. This composition had excellent steepness, low threshold voltage, low temperature dependence of threshold voltage and high stability to heat and ultraviolet rays.

As shown in the above Examples, the present invention can provide the liquid crystal compositions for STN, especially having excellent steepness, low threshold voltage, low temperature dependence of threshold voltage and high stability to heat and ultraviolet rays, while satisfying general characteristics required for the STN display mode.

What is claimed is:

1. A liquid crystal composition which comprises:
   as a first component at least one of the compounds of the following formulas (1-1) and (1-2);
   as a second component at least one of the compounds of the following formula (2);
   as a third component at least one of the compounds of the following formulas (3-1) and (3-2); and
   as a fourth component at least one of the compounds of the following formulas (4-1) to (4-3)

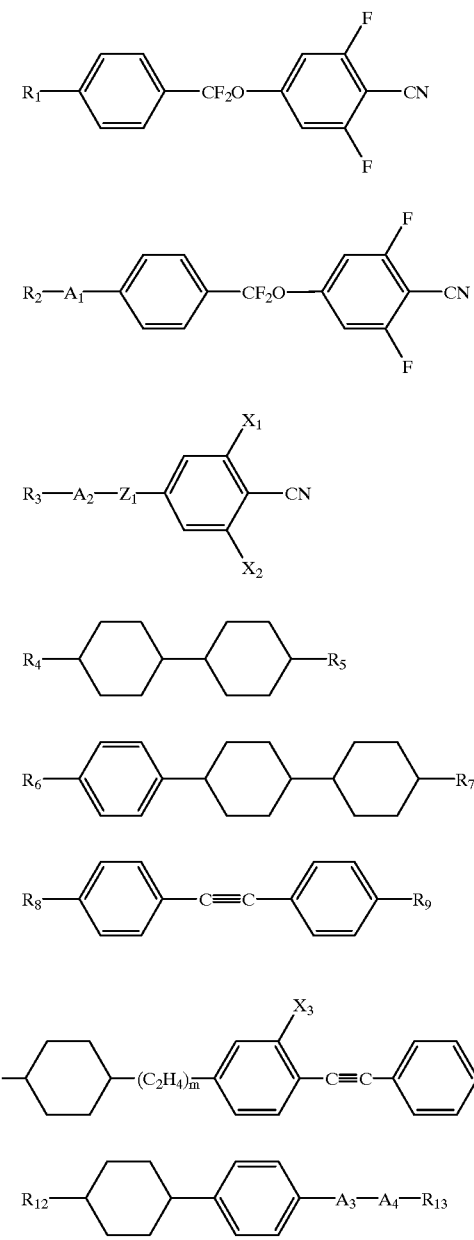

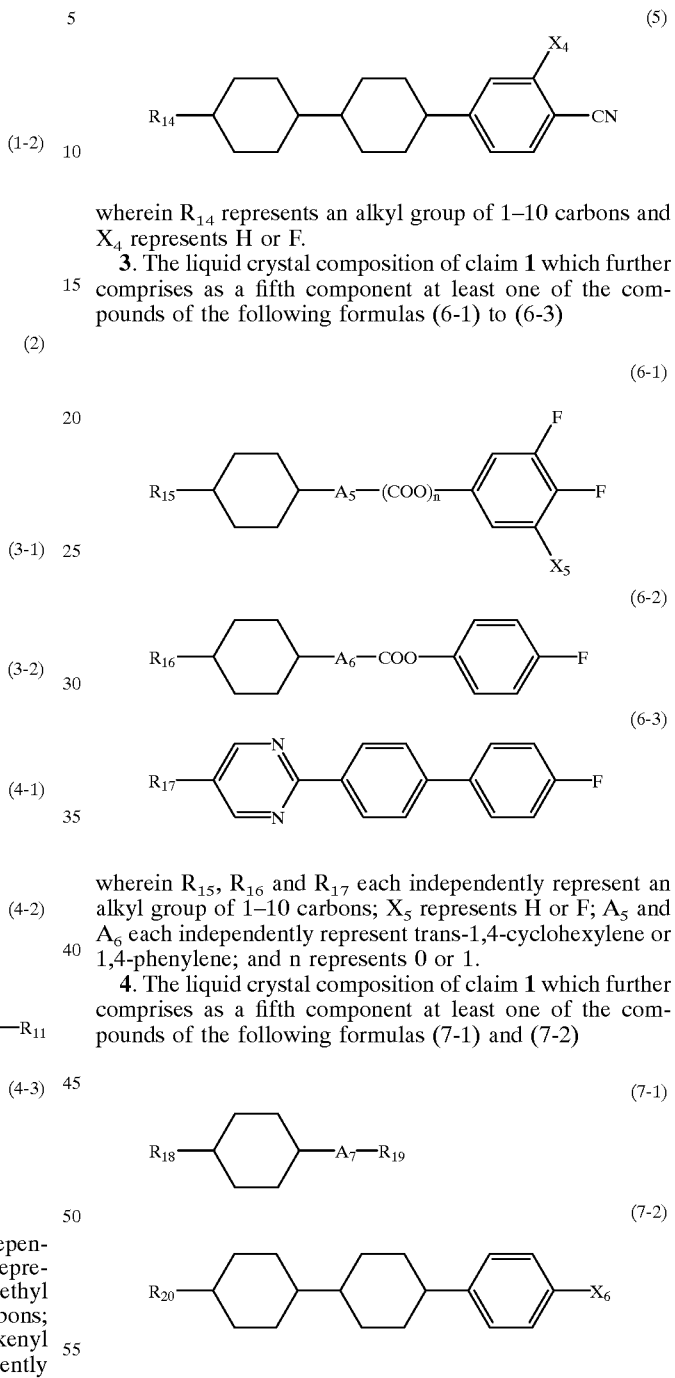

in which $R_1$, $R_2$, $R_6$, $R_8$, $R_{10}$, $R_{11}$ and $R_{13}$ each independently represent an alkyl group of 1–10 carbons; $R_3$ represents an alkyl group of 1–10 carbons, an alkoxymethyl group of 2–10 carbons or an alkenyl group of 2–10 carbons; $R_4$ represents an alkyl group of 1–10 carbons or an alkenyl group of 2–10 carbons; $R_5$ and $R_7$ each independently represent an alkenyl group of 2–10 carbons wherein one or more hydrogen atoms may be replaced by fluorine atoms; $R_9$ represents an alkyl group of 1–10 carbons or an alkoxy group of 1–10 carbons; $R_{12}$ represents an alkyl group of 1–10 carbons or an alkoxymethyl group of 2–10 carbons; $A_1$ represents trans-1,4-cyclohexylene or trans-1,3-dioxane-2,5-diyl; $A_2$ and $A_4$ each independently represent trans-1,4-cyclohexylene or 1,4-phenylene; $A_3$ represents 1,4-phenylene which may be substituted by F; $X_1$, $X_2$ and $X_3$ each independently represent H or F; $Z_1$ represents —COO—, —CH$_2$CH$_2$— or a single bond; and m represents 0 or 1.

2. The liquid crystal composition of claim 1 which further comprises as a fifth component at least one of the compounds of the following formula (5)

wherein $R_{14}$ represents an alkyl group of 1–10 carbons and $X_4$ represents H or F.

3. The liquid crystal composition of claim 1 which further comprises as a fifth component at least one of the compounds of the following formulas (6-1) to (6-3)

wherein $R_{15}$, $R_{16}$ and $R_{17}$ each independently represent an alkyl group of 1–10 carbons; $X_5$ represents H or F; $A_5$ and $A_6$ each independently represent trans-1,4-cyclohexylene or 1,4-phenylene; and n represents 0 or 1.

4. The liquid crystal composition of claim 1 which further comprises as a fifth component at least one of the compounds of the following formulas (7-1) and (7-2)

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F, Cl, an alkyl group of 1–10 carbons or an alkoxy group of 1–10 carbons; and $A_7$ represents trans-1,4-cyclohexylene or 1,4-phenylene.

5. The liquid crystal composition of claim 1 wherein the first component comprises 5–50% by weight, the second component comprises 5–60% by weight and the third component comprises 10–50% by weight and the fourth component comprises 5–30% by weight, based on the total weight of the liquid crystal composition.

6. The liquid crystal composition of claim 1 which further comprises as a fifth component at least one of the compounds of formula (5)

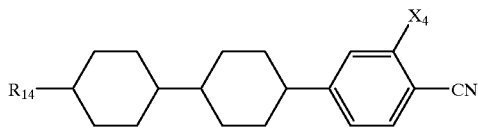
(5)

wherein $R_{14}$ represents an alkyl group of 1–10 carbons and $X_4$ represents H or F, and as a sixth component at least one of the compounds of formulas (6-1) to (6-3) $R_{15}A_r-(COO)_nF$ (6-1)

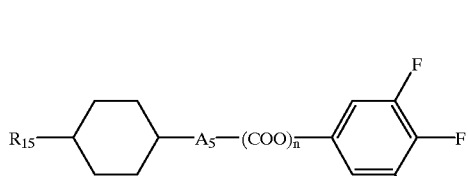
(6-1)

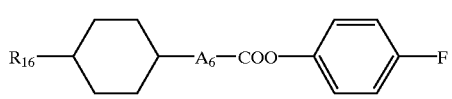
(6-2)

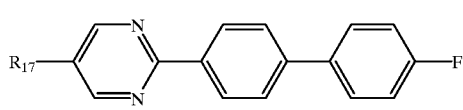
(6-3)

wherein $R_{15}$, $R_{16}$ and $R_{17}$ each independently represent an alkyl group of 1–10 carbons; $X_5$ represents H or F; $A_5$ and $A_6$ each independently represent trans-1,4-cyclohexylene or 1,4-phenylene; and n represents 0 or 1.

7. The liquid crystal composition of claim 1 which further comprises as a fifth component at least one of the compounds of formula (5)

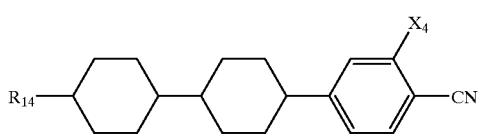
(5)

wherein $R_{14}$ represents an alkyl group of 1–10 carbons and $X_4$ represents H or F, and as a sixth component at least one of the compounds of formulas (7-1) and (7-2)

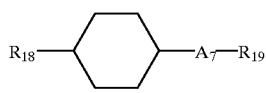
(7-1)

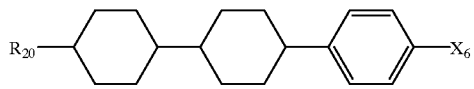
(7-2)

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F or Cl, an alkyl group of 1–10 carbons or an alkoxy group of 1–10 carbons; and $A_7$ represents trans-1,4-cyclohexylene or 1,4-phenylene.

8. The liquid crystal composition of claim 1 which further comprises as a fifth component at least one of the compounds of formulas (6-1) to (6-3)

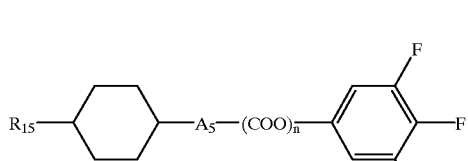
(6-1)

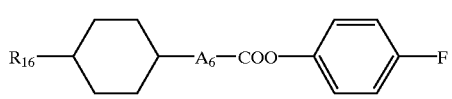
(6-2)

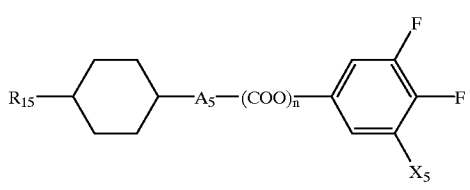

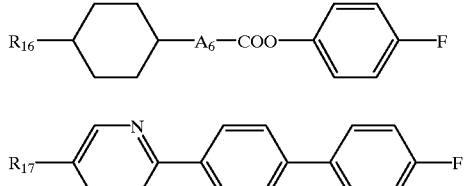
(6-3)

wherein $R_{15}$, $R_{16}$ and $R_{17}$, each independently represent an alkyl group of 1–10 carbons; $X_5$ represents H or F; $A_5$ and $A_6$ each independently represent trans-1,4-cyclohexylene or 1,4-phenylene; and n represents 0 or 1; and as a sixth component at least one of the compounds of formulas (7-1) and (7-2)

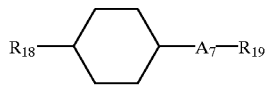
(7-1)

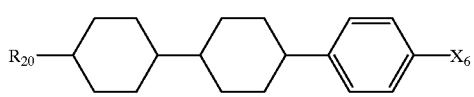
(7-2)

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F or Cl, an alkyl group of 1–10 carbons or an alkoxy group of 1–10 carbons; and $A_7$ represents trans-1,4-cyclohexylene or 1,4 -phenylene.

9. The liquid crystal composition of claim 1 which further comprises as a fifth component at least one of the compounds of formula (5)

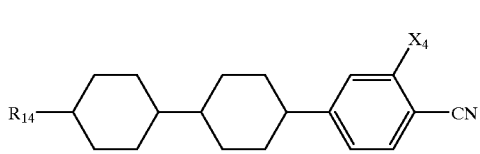

(5)

wherein $R_{14}$ represents an alkyl group of 1–10 carbons and $X_4$ represents H or F, as a sixth component at least one of the compounds of formulas (6-1) to (6-3)

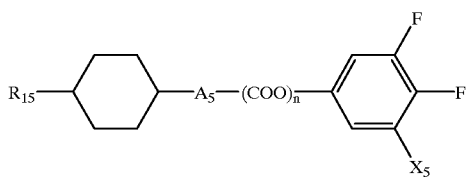

(6-1)

(6-2)

(6-3)

wherein $R_{15}$, $R_{16}$ and $R_{17}$, each independently represent an alkyl group of 1–10 carbons; $X_5$ represents H or F; $A_5$ and $A_6$ each independently represent trans-1,4-cyclohexylene or 1,4-phenylene; and n represents 0 or 1; and as a seventh component at least one of the compounds of formulas (7-1) and (7-2)

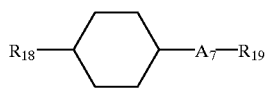

(7-1)

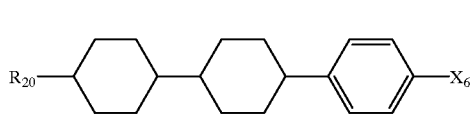

(7-2)

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F or Cl, an alkyl group of 1–10 carbons or an alkoxy group of 1–10 carbons; and $A_7$ represents trans-1,4-cyclohexylene or 1,4-phenylene.

10. The liquid crystal composition of claim 5 which further comprises as the fifth component not more than 35% of at least one of the compounds of formula (5)

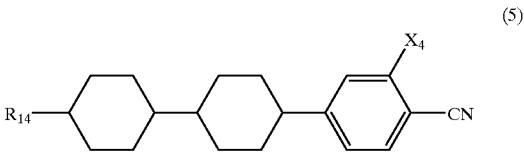

(5)

wherein $R_{14}$ represents an alkyl group of 1–10 carbons and $X_4$ represents H or F, based on the total weight of the liquid crystal composition.

11. The liquid crystal composition of claim 5 which further comprises as the fifth component not more than 30% of at least one of the compounds of formulas (6-1) to (6-3)

(6-1)

(6-2)

(6-3)

wherein $R_{15}$, $R_{16}$ and $R_{17}$ each independently represent an alkyl group of 1–10 carbons; $X_5$ represents H or F; $A_5$ and $A_6$ each independently represent trans-1,4-cyclohexylene or 1,4-phenylene; and n represents 0 or 1; based on the total weight of the liquid crystal composition.

12. The liquid crystal composition of claim 5 which further comprises as the fifth component not more than 30% of at least one of the compounds of formulas (7-1) and (7-2)

(7-1)

(7-2)

wherein $R_1$ and $R_{20}$ each independently represent an alkyl group of 1–10 carbons; $R_{19}$ represents an alkyl group of 1–10 carbons or an alkoxy group of 1–10 carbons; $X_6$ represents F or Cl, an alkyl group of 1–10 carbons or an alkoxy group of 1–10 carbons; and $A_7$ represents trans-1,4-cyclohexylene or 1,4-phenylene; based on the total weight of the liquid crystal composition.

13. The liquid crystal composition of claim 5 which further comprises as the fifth component not more than 35% of at least one of the compounds of formula (5)

(5)

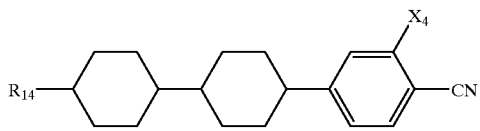

wherein $R_{14}$ represents an alkyl group of 1–10 carbons and $X_4$ represents H or F, and as the sixth component not more than 30% of at least one of the compounds of formulas (6-1) to (6-3)

(6-1)

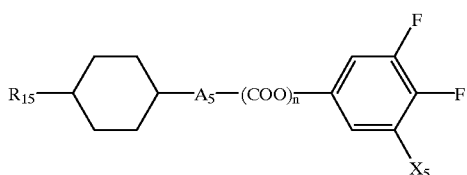

(6-2)

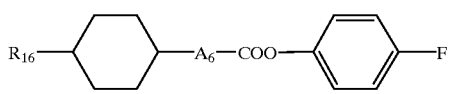

(6-3)

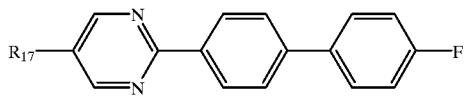

wherein $R_{15}$, $R_{16}$ and $R_{17}$, each independently represent an alkyl group of 1–10 carbons; $X_5$ represents H or F; $A_5$ and $A_6$ each independently represent trans-1,4-cyclohexylene or 1,4-phenylene; and n represents 0 or 1; based on the total weight of the liquid crystal composition.

14. The liquid crystal composition of claim 5 which further comprises as the fifth component not more than 35% of at least one of the compounds of formula (5)

(5)

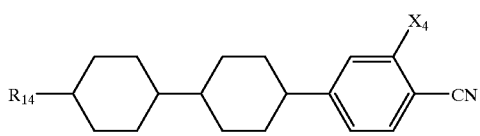

wherein $R_{14}$ represents an alkyl group of 1–10 carbons and $X_4$ represents H or F, and as the sixth component not more than 30% of at least one of the compounds of formulas (7-1) and (7-2)

(7-1)

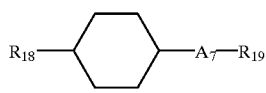

(7-2)

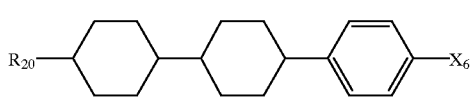

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F or Cl, an alkyl group of 1–10 carbons or an alkoxy group of 1–10 carbons; and $A_7$ represents trans-1,4-cyclohexylene or 1,4-phenylene; based on the total weight of the liquid crystal composition.

15. The liquid crystal composition of claim 5 which further comprises as the fifth component not more than 30% of at least one of the compounds of formulas (6-1) to (6-3)

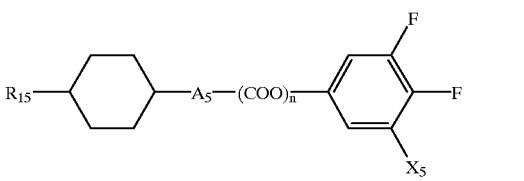

wherein $R_{15}$, $R_{16}$ and $R_{17}$ each independently represent an alkyl group of 1–10 carbons; $X_5$ represents H or F; $A_5$ and $A_6$ each independently represent trans-1,4-cyclohexylene or 1,4-phenylene; and n represents 0 or 1; and as the sixth component not more than 30% of at least one of the compounds of formulas (7-1) and (7-2)

(7-1)

$R_{18}$—⬡—$A_7$—$R_{19}$ (7-2)

$R_{20}$—⬡—⬡—⬢—$X_6$ wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F, Cl, an alkyl group of 1–10 carbons or an alkoxy group of 1–10 carbons; and $A_7$ represents trans-1,4-cyclohexylene or 1,4-phenylene; based on the total weight of the liquid crystal composition.

16. The liquid crystal composition of claim 5 which further comprises as the fifth component not more than 35% of at least one of the compounds of formula (5)

(5)

$R_{14}$—⬡—⬡—⬢(⬢$X_4$)—CN wherein $R_{14}$ represents an alkyl group of 1–10 carbons and $X_4$ represents H or F, as the sixth component not more than 30% of at least one of the compounds of formulas (6-1) to (6-3)

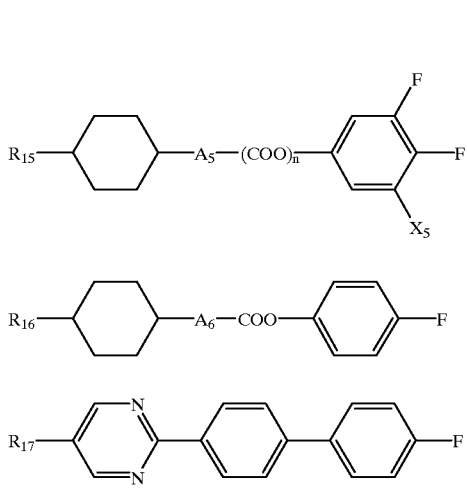

(6-1)

(6-2)

(6-3)

wherein $R_{15}$, $R_{16}$ and $R_{17}$, each independently represent an alkyl group of 1–10 carbons; $X_5$ represents H or F; $A_5$ and $A_6$ each independently represent trans-1,4-cyclohexylene or 1,4-phenylene; and n represents 0 or 1; and as the seventh component not more than 30% of at least one of the compounds of formulas (7-1) and (7-2)

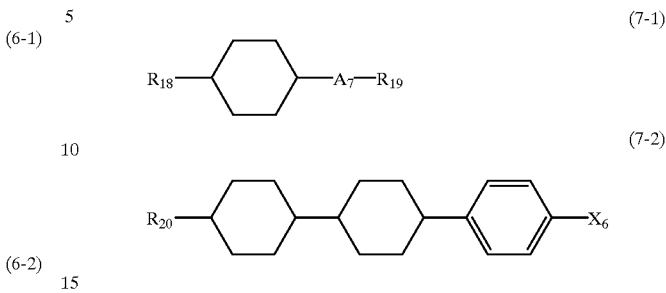

(7-1)

(7-2)

wherein $R_{18}$ and $R_{20}$ each independently represent an alkyl group of 1–10 carbons; $R_{19}$ represents an alkyl group of 1–10 carbons or an alkoxy group of 1–10 carbons; $X_6$ represents F or Cl, an alkyl group of 1–10 carbons or an alkoxy group of 1–10 carbons; and $A_7$ represents trans-1,4-cyclohexylene or 1,4-phenylene; based on the total weight of the liquid crystal composition.

17. A liquid crystal display device using the liquid crystal composition set forth in claim 1.

* * * * *

UNITED STATES PATENT AND TRADEMARK OFFICE
CERTIFICATE OF CORRECTION

PATENT NO.    : 6,214,256 B1
DATED         : April 10, 2001
INVENTOR(S)   : Yoshitaka Tomi et al.

It is certified that error appears in the above-identified patent and that said Letters Patent is hereby corrected as shown below:

Title page,
Item [57] ABSTRACT,
The F for fluorine in formula (1-1) is missing. Please replace formula (1-1) with the one shown below:

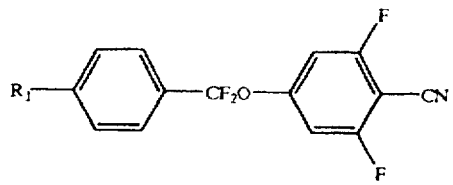

(1-1)

Signed and Sealed this

Twenty-sixth Day of March, 2002

Attest:

JAMES E. ROGAN
*Attesting Officer*    *Director of the United States Patent and Trademark Office*